(12) United States Patent
Kim et al.

(10) Patent No.: US 11,936,064 B2
(45) Date of Patent: Mar. 19, 2024

(54) FUNCTIONAL SEPARATOR, METHOD FOR MANUFACTURING THE SAME, AND LITHIUM SECONDARY BATTERY COMPRISING THE SAME

(71) Applicant: LG CHEM, LTD., Seoul (KR)

(72) Inventors: Kihyun Kim, Daejeon (KR); Jangsoo Lee, Daejeon (KR); Seungbo Yang, Daejeon (KR); Soohyun Kim, Daejeon (KR); Minsu Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 583 days.

(21) Appl. No.: 17/262,527

(22) PCT Filed: Apr. 28, 2020

(86) PCT No.: PCT/KR2020/005616
§ 371 (c)(1),
(2) Date: Jan. 22, 2021

(87) PCT Pub. No.: WO2020/226330
PCT Pub. Date: Nov. 12, 2020

(65) Prior Publication Data
US 2021/0288380 A1    Sep. 16, 2021

(30) Foreign Application Priority Data

May 9, 2019 (KR) .................. 10-2019-0054322
Apr. 24, 2020 (KR) .................. 10-2020-0049801

(51) Int. Cl.
*H01M 50/403* (2021.01)
*H01M 4/38* (2006.01)
(Continued)

(52) U.S. Cl.
CPC .......... *H01M 50/403* (2021.01); *H01M 4/38* (2013.01); *H01M 10/0525* (2013.01);
(Continued)

(58) Field of Classification Search
CPC .......... H01M 10/052; H01M 10/0525; H01M 10/4235; H01M 4/38; H01M 50/403;
(Continued)

(56) References Cited

U.S. PATENT DOCUMENTS

2005/0178659 A1    8/2005  Takahashi et al.
2018/0062176 A1*   3/2018  Liao .................. H01M 10/0568
(Continued)

FOREIGN PATENT DOCUMENTS

CN    104103791 A    10/2014
CN    105702928 A    6/2016
(Continued)

OTHER PUBLICATIONS

Extended European Search Report dated Nov. 4, 2021 for Application No. 20802874.6.
(Continued)

*Primary Examiner* — Victoria H Lynch
(74) *Attorney, Agent, or Firm* — Birch, Stewart, Kolasch & Birch, LLP

(57) ABSTRACT

In order to solve the problem caused by leaching of lithium polysulfide, disclosed is a functional separator, a method of manufacturing the same, and a lithium secondary battery including the same, which can improve the capacity and life of the battery by coating a material capable of reducing lithium polysulfide on the separator surface. The functional separator includes a base separator; and a redox active polymer-conductive carbon composite layer on a surface of the base separator.

12 Claims, 2 Drawing Sheets

(a)

(b)

(51) Int. Cl.
*H01M 10/0525* (2010.01)
*H01M 50/411* (2021.01)
*H01M 50/431* (2021.01)
*H01M 50/449* (2021.01)

(52) U.S. Cl.
CPC ....... *H01M 50/411* (2021.01); *H01M 50/431* (2021.01); *H01M 50/449* (2021.01)

(58) Field of Classification Search
CPC ............. H01M 50/409; H01M 50/411; H01M 50/414; H01M 50/417; H01M 50/431; H01M 50/443; H01M 50/446; H01M 50/449; H01M 50/451; H01M 50/489; Y02E 60/10
See application file for complete search history.

(56) References Cited

U.S. PATENT DOCUMENTS

| | | |
|---|---|---|
| 2018/0198156 A1 | 7/2018 | Lee et al. |
| 2020/0328391 A1 | 10/2020 | Song et al. |

FOREIGN PATENT DOCUMENTS

| | | | |
|---|---|---|---|
| CN | 107925042 A | 4/2018 | |
| CN | 109686902 A | 4/2019 | |
| EP | 3 312 906 A1 | 4/2018 | |
| EP | 3 624 223 A1 | 3/2020 | |
| EP | 3 667 768 A1 | 6/2020 | |
| JP | 2004-22295 A | 1/2004 | |
| KR | 10-2006-0045321 A | 5/2006 | |
| KR | 10-1517864 B1 | 5/2015 | |
| KR | 10-2017-0090294 A | 8/2017 | |
| KR | 10-2018-0138126 A | 12/2018 | |
| KR | 10-2019-0046315 A | 5/2019 | |
| KR | 10-2019-0046316 A | 5/2019 | |
| WO | WO-2017120642 A1 * | 7/2017 | ............. B29C 48/30 |
| WO | WO 2017/139941 A1 | 8/2017 | |
| WO | WO 2019/079945 A2 | 4/2019 | |
| WO | WO 2019/083193 A1 | 5/2019 | |

OTHER PUBLICATIONS

Pan et al., "Polydopamine-based redox-active separators for lithium-ion batteries", Journal of Materiomics, vol. 5, 2019 (Available online Dec. 16, 2018), pp. 204-213.

International Search Report (PCT/ISA/210) issued in PCT/KR2020/005616, dated Aug. 7, 2020.

Li et al. "Chemisorption of polysulfides through redox reactions with organic molecules for lithium-sulfur batteries," Nature Communications, vol. 9, No. 705, 2018, pp. 1-10.

Mathi et al., "Graphitic carbon coupled poly(anthraquinone) for proton shuttle flow in-a-cell application," Physical Chemistry Chemical Physics, 2017, pp. 1-20.

Song et al. "Polyanthraquinone as a Reliable Organic Electrode for Stable and Fast Lithium Storage," Angew. Chem. Int. Ed., vol. 54, 2015, pp. 1-6.

* cited by examiner

[Figure 1]
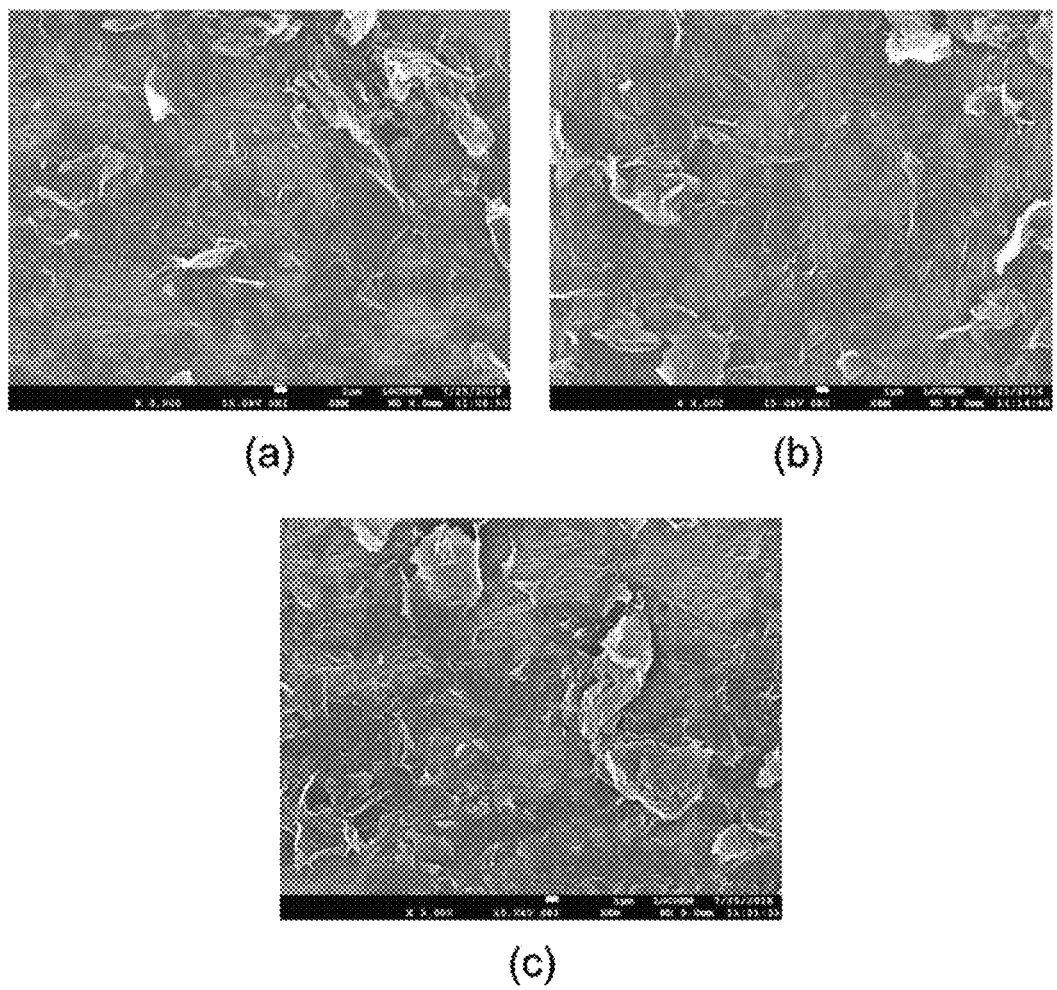

[Figure 2]
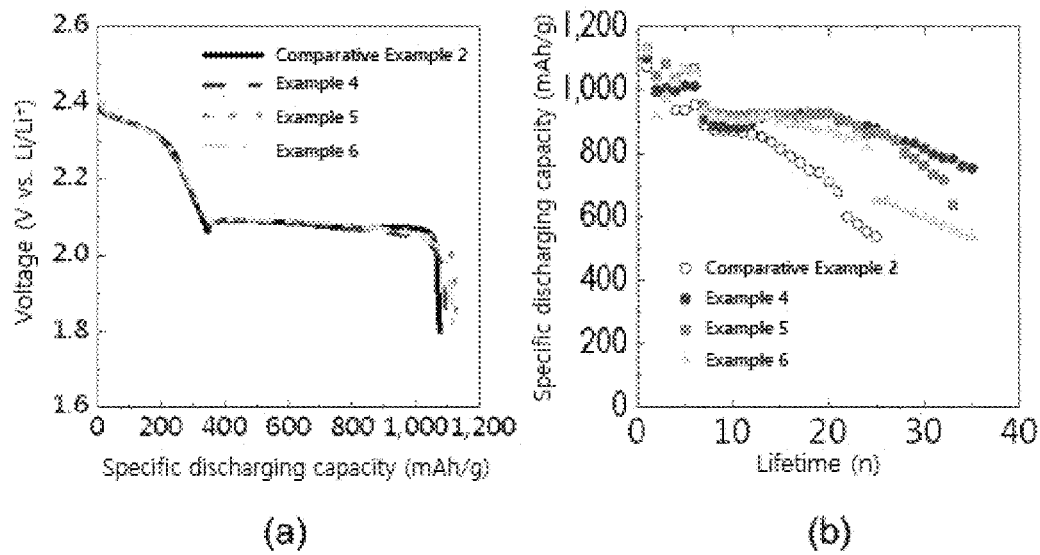
[Figure 3]
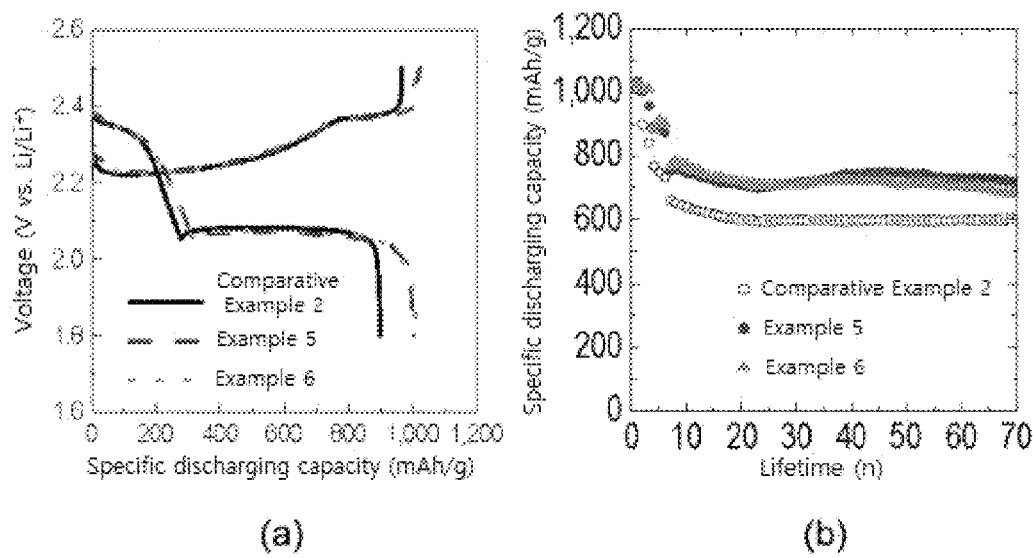

FUNCTIONAL SEPARATOR, METHOD FOR MANUFACTURING THE SAME, AND LITHIUM SECONDARY BATTERY COMPRISING THE SAME

TECHNICAL FIELD

The present application claims the benefits of priorities based on Korean Patent Application No. 10-2019-0054322 filed on May 9, 2019 and Korean Patent Application No. 10-2020-0049801 filed on Apr. 24, 2020, the entire contents of which are incorporated herein by reference.

The present invention relates to a functional separator, a method for manufacturing the same, and a lithium secondary battery comprising the same, more particularly, to a functional separator capable of improving the capacity and lifetime of the battery by coating a material capable of reducing the lithium polysulfide on the surface of the separator to solve the problem caused by the leaching of lithium polysulfide, a method for manufacturing the same, and a lithium secondary battery comprising the same.

BACKGROUND ART

As interest in energy storage technology continues to increase, since its application is expanding from energy for mobile phones, tablets, laptops and camcorders to even energy for electric vehicles (EVs) and hybrid electric vehicles (HEVs), research and development of electrochemical devices are gradually increasing. The field of electrochemical devices is an area that is receiving the most attention in this respect. Among them, the development of secondary batteries such as a lithium-sulfur battery capable of being charged/discharged has become a focus of attention. In recent years, in developing these batteries, in order to improve capacity density and specific energy, it has led to research and development in designs for new electrodes and batteries.

Among these electrochemical devices, a lithium-sulfur battery (Li—S battery) has a high energy density (theoretical capacity) and thus is in the spotlight as a next-generation secondary battery that can replace a lithium-ion battery. In such a lithium-sulfur battery, a reduction reaction of sulfur and an oxidation reaction of lithium metal occur during discharge. At this time, sulfur forms lithium polysulfide (LiPS) having a linear structure from Ss having a ring structure. This lithium-sulfur battery is characterized by showing a stepwise discharging voltage until the polysulfide is completely reduced to $Li_2S$.

However, the biggest obstacle of the lithium-sulfur battery in the commercialization is the leaching and shuttle phenomenon of the lithium polysulfide, which causes a big problem that the capacity of the lithium-sulfur battery is reduced. That is, since polysulfide leached from the positive electrode has high solubility in the organic electrolyte solution, undesired polysulfide migration (PS shuttling) to the negative electrode through the electrolyte solution may occur. As a result, a decrease in capacity due to irreversible loss of the positive electrode active material and a decrease in the lifetime of the battery by deposition of sulfur particles on the surface of the lithium metal due to side reactions are occurred. In order to solve these problems, various studies such as adding PS adsorbent to the positive electrode composite or modifying the separator made of existing PE, etc. are being conducted, but it is a real state that no clear solution has been suggested.

DISCLOSURE

Technical Problem

Therefore, in order to solve the problems caused by the leaching of the lithium polysulfide, it is an object of the present invention to provide a functional separator, a method for manufacturing the same, and a lithium secondary battery including the same, which can improve the capacity and lifetime of the battery by coating a redox functional group-containing polymer, which is capable of reducing lithium polysulfide, and an electrically conductive carbon on the surface of the separator.

Technical Solution

In order to achieve the above object, the present invention provides a functional separator comprising a base separator and a redox active polymer-conductive carbon composite layer located on the surface of the base separator.

In addition, the present invention provides a method for manufacturing a functional separator comprising the steps of, (a) preparing a redox active polymer-conductive carbon composite dispersion by dispersing a redox functional group-containing polymer and conductive carbon in a solvent; and (b) coating the prepared redox active polymer-conductive carbon composite dispersion on the surface of the base separator.

In addition, the present invention provides a lithium secondary battery comprising a positive electrode, a negative electrode, the functional separator interposed between the positive electrode and the negative electrode, and an electrolyte.

Advantageous Effects

The functional separator, a method for manufacturing the same, and a lithium secondary battery comprising the same according to the present invention have an advantage of improving the capacity and lifetime of the battery by coating a redox functional group-containing polymer, which is capable of reducing lithium polysulfide, and an electrically conductive carbon on the surface of the separator, in order to solve the problems caused by the leaching of the lithium polysulfide.

DESCRIPTION OF DRAWINGS

FIG. 1 is an image of the surface of the functional separators according to the present invention observed by an electron microscope.

FIGS. 2 and 3 are graphs showing discharging capacity (a) and lifetime characteristics (b) of the lithium secondary batteries according to examples of the present invention and a comparative example.

BEST MODE

Hereinafter, the present invention will be described in detail.

The functional separator according to the present invention comprises a base separator and a redox active polymer-conductive carbon composite layer located on the surface of the base separator.

The separator is interposed between the positive electrode and the negative electrode (that is, a physical separator having a function of physically separating the electrodes), and enables the transport of lithium ions between the positive electrode and the negative electrode, while separating or insulating the positive electrode and the negative electrode from each other. In particular, the separator is preferred as it has a low resistance to ion migration of the electrolyte and an excellent electrolyte impregnation ability, and the separator can be made of a porous, non-conductive or insulating material.

The base separator in which the redox active polymer-conductive carbon composite layer is excluded may be an independent member such as a film or a coating layer added (adhered or faced) to any one or more of positive and negative electrodes. Specifically, as a base separator, porous polymer films, for example, porous polymer films made of polyolefin-based polymers, such as an ethylene homopolymer, a propylene homopolymer, an ethylene/butene copolymer, an ethylene/hexene copolymer and an ethylene/methacrylate copolymer may be used alone or may be stacked and used, or the base separator may be a conventional porous nonwoven fabric, for example, a non-woven fabric made of high melting point glass fiber or polyethylene terephthalate fiber, but is not limited thereto.

The conductive carbon constituting the redox active polymer-conductive carbon composite layer is coated with the redox active polymer on the surface of the base separator, and the conductive carbon itself has a pore structure, so the electrolyte solution is free to enter and exit. In addition, the conductive carbon, as its name suggests, has conductivity and can improve the reduction efficiency of lithium polysulfide by transferring electrons to the redox active polymer by such a property.

The conductive carbons may be applied without particular limitation as long as they are conductive carbon materials capable of exhibiting the above effects. Among them, carbon nanotubes (CNT), graphene, and reduced graphene oxide (rGO) can be exemplified, and among these, the use of the reduced graphene oxide is preferable, and it is more preferable to use thermally exfoliated reduced graphene oxide (TErGO), which is advantageous in exfoliation due to thermal expansion and can thus coat thin and large areas, thereby exhibiting excellent performance.

The thermally exfoliated reduced graphene oxide (TErGO) may be formed by heat-treating graphene oxide to prepare a thermally expanded graphene oxide (or thermally exfoliated graphene oxide) and then reducing it. At this time, the heat treatment for the preparation of the thermally expanded graphene oxide may be performed by a known method or various modified methods thereof, and is not particularly limited in the present invention. For example, the heat treatment may be performed for 10 minutes to 3 hours in a temperature range of 300 to 900° C.

In particular, the thermally exfoliated reduced graphene oxide (TErGO) is one which is exfoliated, and may have a thickness of 0.5 to 40 nm, preferably 5 to 30 nm, more preferably 10 to 20 nm, and may have a plate shape or flake shape. In addition, the degree of thermal expansion of the thermally exfoliated reduced graphene oxide (TErGO) may vary from 100 m²/g to 900 m²/g in the range of BET, and the degree of reduction can be measured through XPS or EA. In addition, the general graphene oxide may have a mass ratio of carbon and oxygen of about 1:1, whereas the reduced graphene oxide may have a mass ratio of about 9:1.

In general, since the reduced graphene oxide before exfoliation has a thickness of about 50 to 500 nm and is easily detached when coated in the form of particles (even if it is not a separator), not only does it require the use of a binder, but also the coating density is low, so that the desired effect cannot be sufficiently obtained. However, according to the present invention, it is possible to uniformly and densely coat on the substrate by using thermally exfoliated reduced graphene oxide in the form of a plate or flake having a range of thickness through exfoliation.

In addition, the conductive carbon has pores formed in itself and the porosity of the conductive carbon is 40 to 90%, preferably 60 to 80%. If the porosity of the conductive carbon is less than 40%, the transfer of lithium ions may not be normally performed, thereby causing a problem by acting as a resistance component. If the porosity of the conductive carbon exceeds 90%, there may be a problem that the mechanical strength is lowered. In addition, the pore size of the conductive carbon is 10 nm to 5 μm, and preferably 50 nm to 5 μm. If the pore size is less than 10 nm, there may be a problem that lithium ion permeation is impossible. If the size of the pores exceeds 5 μm, there may be short circuit and safety problems due to contact between electrodes.

On the other hand, a binder may be interposed between the base separator and the redox active polymer-conductive carbon composite layer so that the redox active polymer-conductive carbon composite layer can be more easily coated on the surface of the base separator. However, in the case of using the thermally exfoliated reduced graphene oxide (TErGO) among the conductive carbon, in particular, reduced graphene oxide (rGO), of the present invention, since the conductive carbon is made of a plate-like structure, the conductive carbon layer can be free-standing without the binder and easily coated on the surface of the base separator.

In addition to the conductive carbon, the redox active polymer (or redox functional group-containing polymer) constituting the redox active polymer-conductive carbon composite layer is used to maximize the reduction efficiency of the lithium polysulfide, and due to its chemical bonding with the conductive carbon or its physical properties, it is possible to more smoothly transfer lithium ions, while improving the bonding force with the base separator.

More specifically, the redox active polymer is a component that promotes the reduction of lithium polysulfide (LiPS), which is leached from a positive electrode, through redox action, and for example, the redox active polymer may be a lithium-conducting compound that expresses electrical conductivity by accepting electrons to form a redox band. Such redox active polymer can be representatively exemplified by quinone-based compounds, such as polyanthraquinones, such as poly(1,4-anthraquinone) (P14AQ) represented by Formula 1 below and poly(1,5-anthraquinone) (P15AQ); polynaphthoquinone; and polybenzoquinone:

[Formula 1]

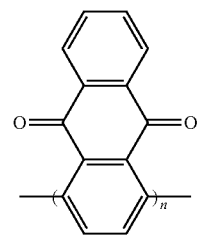

wherein n is a natural number from 1 to 1,000.

In addition, the redox active polymer may be π conjugated compounds such as polyaniline, polythiophene, polypyrrole, polyacetylene, poly-p-phenylene, polyphenylene vinylene, polyperi-naphthalene, polyfuran, polyfluorene, polythienylene, polypyridine diyl, polyisothianaphthene, polyquinoxaline, polypyridine, polypyrimidine, polyindole, polyaminoanthraquinone, polyimidazole and derivatives thereof and is not particularly limited as long as it expresses electrical conductivity by forming a redox band when receiving electrons.

In the redox active polymer-conductive carbon composite layer, the weight ratio of the conductive carbon and redox active polymer may be 1:0.001 to 0.2, preferably 1:0.002 to 0.1. If the weight ratio of the conductive carbon and the redox active polymer is outside the weight ratio described above, the effects of using the redox active polymer and conductive carbon can be insufficient. In addition, the number average molecular weight (Mn) of the redox active polymer may be 500 to 200,000, preferably 1,000 to 100,000.

The redox active polymer-conductive carbon composite layer may be formed on a part of the surface of the base separator, but in order to maximize the effect of the use of conductive carbon and redox active polymer, it is preferable to form the entire surface of the base separator. The redox active polymer-conductive carbon composite layer has a thickness of 0.1 to 20 μm, preferably 0.5 to 10 μm, more preferably 0.5 to 5 μm. If the thickness of the redox active polymer-conductive carbon composite layer is less than 0.1 μm, since the conductive network is not sufficiently formed, there is a problem that electronic conductivity is lowered. If the thickness of the PEO-conductive carbon composite layer exceeds 20 μm, there is a concern that the passage of lithium ions is hindered, the cell resistance is increased, and an adverse problem occurs in terms of energy density per volume.

In addition, the redox active polymer-conductive carbon composite layer is formed and positioned in a content of 1 to 200 μg/cm$^2$, preferably 5 to 100 μg/cm$^2$, more preferably 5 to 50 μg/cm$^2$, relative to the surface area of the base separator. If the coating content of the redox active polymer-conductive carbon composite layer is less than 1 μg/cm$^2$ relative to the surface area of the base separator, the effect arising from the use of the conductive carbon and the redox active polymer may be insignificant. If the coating content of the redox active polymer-conductive carbon composite layer exceeds 200 μg/cm$^2$, there may be no additional effect obtained by using the conductive carbon and the redox active polymer.

Next, a method of manufacturing a functional separator according to the present invention will be described. The method of manufacturing a functional separator comprises the steps of (a) preparing a redox active polymer-conductive carbon composite dispersion by dispersing a redox functional group-containing polymer and conductive carbon in a solvent and (b) coating the prepared redox active polymer-conductive carbon composite dispersion on the surface of the base separator.

Examples of the solvent may comprise water, and organic solvents such as ethanol, acetone, IPA, THF, MC, DMF, DMSO, and DMAc. Among them, it may be desirable to apply THF or a compound having similar properties as a solvent. In addition, after dispersing the redox functional group-containing polymer and conductive carbon in a solvent in step (a), the reaction between the redox functional group-containing polymer and conductive carbon (bonding by π-π interaction) is carried out, wherein the reaction can be carried out under room temperature to 100° C., preferably 40 to 70° C. for 1 to 24 hours, and through the reaction as described above, electrons are transferred to a redox functional group to reduce lithium polysulfide.

As described above, after the redox active polymer-conductive carbon composite dispersion (or redox active polymer-conductive carbon composite) including conductive carbon and redox active polymer is prepared, the functional separator according to the present invention is prepared by coating the redox active polymer-conductive carbon composite dispersion on the surface of the base separator. At this time, the coating may be performed by a drop-cast method, a dip-coating method, a blade coating method, a spray coating method, a Meyer bar coating method or a vacuum filter.

Lastly, a lithium secondary battery comprising the functional separator provided by the present invention will be described. The lithium secondary battery comprising the functional separator comprises a positive electrode, a negative electrode, a functional separator interposed between the positive electrode and the negative electrode and an electrolyte, and can be exemplified as any lithium secondary battery known in the art, such as a lithium-sulfur battery, a lithium air battery, and a lithium metal battery, and is preferably a lithium-sulfur battery. The description of the functional separator comprised in the lithium secondary battery is as described above. In addition, the positive electrode, the negative electrode, and the electrolyte applied to the lithium secondary battery may be common ones used in the art, and detailed description thereof will be described later.

Meanwhile, the present invention can also provide a battery module comprising the lithium secondary battery as a unit cell and a battery pack including the same. The battery module or the battery pack may be used as a power source for any one or more medium and large-sized devices of a power tool; an electric vehicle including an electric vehicle (EV), a hybrid electric vehicle, and a plug-in hybrid electric vehicle (PHEV); or a power storage system, etc.

Hereinafter, a description of the positive electrode, the negative electrode, and the electrolyte applied to the lithium secondary battery according to the present invention is added.

Positive Electrode

The positive electrode used in the present invention will be described below. After preparing a composition for the positive electrode containing the positive electrode active material, the electrically conductive material, and the binder, the slurry prepared by diluting such a composition in a predetermined solvent (disperse medium) can be directly coated and dried on a positive electrode current collector to form a positive electrode layer. Alternatively, after casting the slurry on a separate support, a film obtained by peeling from the support can be laminated on a positive electrode current collector to produce a positive electrode layer. In addition, the positive electrode can be manufactured in a variety of ways using methods well known to those skilled in the art.

The electrically conductive material not only serves as a path for electrons to move from the positive electrode current collector to the positive electrode active material, thereby imparting electronic conductivity, but also electrically connects the electrolyte and the positive electrode active material, thereby simultaneously serving as a path for lithium ions (Li+) in the electrolyte to move to and react with sulfur. Therefore, if the amount of the electrically conductive material is insufficient or the electrically conductive material does not perform properly, the non-reacting portion of sulfur in the electrode is increased and eventually the reduction of capacity is caused. Also, the high rate discharging characteristics and the charging/discharging cycle lifetime are adversely affected. Therefore, it is necessary to add an appropriate amount of the electrically conductive material. The electrically conductive material is preferably added in an amount of 0.01 to 30% by weight based on the total weight of the positive electrode composition.

The electrically conductive material is not particularly limited as long as it has electrical conductivity without causing chemical changes in the battery, and for example, graphite; carbon blacks such as Denka black, acetylene black, Ketjen black, channel black, furnace black, lamp black, and thermal black; electrically conductive fibers such as carbon fibers and metal fibers; carbon fluoride; metal powders such as aluminum, and nickel powder; electrically conductive whiskers such as zinc oxide and potassium titanate; electrically conductive metal oxides such as titanium oxide; electrically conductive materials such as polyphenylene derivatives and the like can be used. Specific examples of commercially available and electrically conductive materials may comprise acetylene black series of products from Chevron Chemical Company or Denka black (Denka Singapore Private Limited), products form Gulf Oil Company, Ketjen black, EC series of products from Armak Company, products of Vulcan XC-72 from Cabot Company and Super P (products from Timcal Company).

The binder is for attaching the positive electrode active material to the current collector well. The binder should be well dissolved in the solvent, and should not only constitute the conductive network between the positive electrode active material and the electrically conductive material, but also have a proper impregnation property into the electrolyte solution. The binder may be any binder known in the art, and specifically may be, but is not limited thereto, any one selected from the group consisting of fluororesin-based binders including polyvinylidene fluoride (PVdF) or polytetrafluoroethylene (PTFE); rubber-based binders including styrene-butadiene rubber, acrylonitrile-butadiene rubber, and styrene-isoprene rubber; cellulose-based binders including carboxymethylcellulose (CMC), starch, hydroxypropylcellulose, and regenerated cellulose; polyalcohol-based binders; polyolefin-based binders including polyethylene and polypropylene; polyimide-based binders, polyester-based binders, silane-based binders and mixtures or copolymers of two or more thereof.

The content of the binder may be, but is not limited to, 0.5 to 30 wt. % based on the total weight of the composition for the positive electrode. If the content of the binder resin is less than 0.5 wt. %, the physical properties of the positive electrode may be deteriorated and thus positive electrode active material and the electrically conductive material can be broken away. If the content exceeds 30 wt. %, the ratio of the active material and the electrically conductive material in the positive electrode is relatively reduced and thus the battery capacity can be reduced and the content can act as a resistive element, reducing efficiency.

The composition for the positive electrode comprising the positive electrode active material, the electrically conductive material, and the binder may be diluted in a predetermined solvent and coated on a positive electrode current collector using a conventional method known in the art. First, a positive electrode current collector is prepared. The positive electrode current collector generally has a thickness of 3 to 500 μm. The positive electrode current collector is not particularly limited as long as it has a high electrical conductivity without causing chemical changes in the battery, and for example, may be stainless steel, aluminum, nickel, titanium, sintered carbon, or aluminum or stainless steel surface-treated with carbon, nickel, titanium, silver, or the like. The current collector can also increase the adhesive force of the positive electrode active material by forming fine irregularities on its surface and can be in various forms such as film, sheet, foil, net, porous body, foam, and nonwoven fabric.

Next, a slurry obtained by diluting the composition for the positive electrode containing the positive electrode active material, the electrically conductive material, and the binder in a solvent is applied to the positive electrode current collector. The composition for the positive electrode containing the above-described positive electrode active material, electrically conductive material, and binder may be mixed with a predetermined solvent to prepare the slurry. At this time, the solvent should be easy to dry, and it is most preferable to be able to dissolve the binder well, but to keep the positive electrode active material and the electrically conductive material in a dispersed state without dissolving. If the solvent dissolves the positive electrode active material, since the specific gravity (D=2.07) of sulfur in the slurry is high, there is a tendency that the sulfur is submerged in the slurry, which in turn causes sulfur to flow into the current collector during coating and cause problems in the electrically conductive network, thereby causing problems with regard to the operation of the battery. The solvent (disperse medium) may be water or an organic solvent. The organic solvent may be at least one selected from the group consisting of dimethylformamide, isopropyl alcohol, acetonitrile, methanol, ethanol and tetrahydrofuran.

Subsequently, there is no particular limitation on the method of applying the composition for the positive electrode in the slurry state. For example, a coating layer may be prepared by a doctor blade coating method, a dip coating method, a gravure coating method, a slit die coating method, a spin coating method, a comma coating method, a bar coating method, a reverse roll coating method, a screen coating method, and a cap coating method, etc. Thereafter, in the composition for the positive electrode that has undergone such a coating process, evaporation of the solvent (disperse medium), compaction of the coating film and adhesion between the coating film and the current collector is achieved through a drying process. At this time, drying is performed according to a conventional method, and is not particularly limited.

Negative Electrode

As the negative electrode, any one capable of intercalation and deintercalation of lithium ions can be used. For example, metal materials such as lithium metal and lithium alloy, and carbon materials such as low crystalline carbon and high crystalline carbon can be exemplified. As the low crystalline carbon, soft carbon and hard carbon are typical. As the high crystalline carbon, high temperature sintered carbon such as natural graphite, Kish graphite, pyrolytic carbon, mesophase pitch based carbon fiber, meso-carbon microbeads, mesophase pitches, and petroleum or coal tar pitch derived cokes are typical. In addition, alloy series containing silicon, oxides such as $Li_4Ti_5O_{12}$ or the like are also well-known negative electrodes.

In this case, the negative electrode may comprise a binder. The binder may be various kinds of binder polymers such as polyvinylidenefluoride (PVDF), polyvinylidenefluoride-hexafluoropropylene copolymer (PVDF-co-HFP), polyacrylonitrile, polymethylmethacrylate, and styrene-butadiene rubber (SBR).

The negative electrode may optionally further comprise a negative electrode current collector for supporting the negative electrode active layer containing the negative electrode active material and the binder. The negative electrode current collector may be specifically selected from the group consisting of copper, stainless steel, titanium, silver, palladium, nickel, alloys thereof, and combinations thereof. The stainless steel may be surface-treated with carbon, nickel, titanium or silver, and an aluminum-cadmium alloy may be used as an alloy. In addition, a sintered carbon, a nonconductive polymer surface-treated with a conductive material, or a conductive polymer may be used.

The binder serves to paste the negative electrode active material, to bond the active materials to each other, to bond the active material and the current collector, to buffer the expansion and contraction of the active material and so on. Specifically, the binder is the same as described above for the binder of the positive electrode. Also, the negative electrode may be lithium metal or lithium alloy. The non-limiting examples of the negative electrode may be a thin film of lithium metal, and may be an alloy of lithium and at least one metal selected from the group consisting of Na, K, Rb, Cs, Fr, Be, Mg, Ca, Sr, Ba, Ra, Al, and Sn.

Electrolyte

The electrolyte solution comprises solvents and lithium salt, and if necessary, may further contain additives. The solvent can be used without particular limitation, as long as it is a conventional non-aqueous solvent that serves as a medium through which ions involved in the electrochemical reaction of the battery can move. Examples of the non-aqueous solvent may comprise carbonate-based solvents, ester-based solvents, ether-based solvents, ketone-based solvents, alcohol-based solvents, aprotic solvents and the like.

More specifically, examples of the carbonate-based solvent may comprise dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), etc. Examples of the ester-based solvent may specifically include methyl acetate, ethyl acetate, n-propyl acetate, 1,1-dimethyl ethyl acetate, methyl propionate, ethyl propionate, γ-butyrolactone, decanolide, valerolactone, mevalonolactone, carprolactone, etc. Examples of the ether-based solvent may specifically include diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, polyethylene glycol dimethyl ether, etc. In addition, examples of the ketone-based solvent may comprise cyclohexanone, etc. Examples of the alcohol-based solvent may comprise ethylalcohol, isopropylalcohol, etc. Examples of the aprotic solvent may comprise nitriles such as acetonitrile, amides such as dimethylformamide, dioxolanes such as 1,3-dioxolane (DOL), sulfolane, etc. The non-aqueous organic solvents may be used alone or in combination of two or more. The mixing ratio when using in combination of two or more may be appropriately adjusted depending on the desired performance of the battery, and a solvent in which 1,3-dioxolane and dimethoxyethane are mixed in a volume ratio of 1:1 can be exemplified.

Hereinafter, preferred examples are provided to help understanding of the present invention, but the following examples are merely illustrative of the present invention, and it is apparent to those skilled in the art that various changes and modifications can be made within the scope and technical spirit of the present invention, and it is natural that such changes and modifications belong to the appended claims.

[Example 1] Preparation of Functional Separator

First, thermally exfoliated reduced graphene oxide (TErGO, self-prepared by the applicant), 0.2 parts by weight of poly(1,4-anthraquinone) (redox active polymer, self-synthesized by the applicant) relative to 100 parts by weight of the thermally exfoliated reduced graphene oxide were dispersed at 30° C. for 3 hours in the presence of the solvent THF to prepare a P14AQ-rGO composite dispersion.

Subsequently, the prepared P14AQ-rGO composite dispersion is coated on the surface of the porous base separator made of polyethylene by a vacuum filtration method and dried it to prepare a functional separator (air permeability: 202 Sec/100 mL) having a content of the coating layer (P14AQ-rGO) of 20 μg/cm$^2$ relative to the surface area of the base separator and a thickness of 1 μm.

Meanwhile, both the thermally exfoliated reduced graphene oxide used in the preparation of the P14AQ-rGO composite dispersion and poly(1,4-anthraquinone) are prepared through the applicant's own preparation/synthesis. Specifically, the thermally exfoliated reduced graphene oxide was prepared at a thickness of 15 nm by reducing the graphene oxide (SE2430, Sixth Element, China) by heat treatment at 300° C. for 1 hour and then using a high-speed mixer and ultrasonic homogenizer.

In addition, poly(1,4-anthraquinone) was synthesized through the following process. First, 3.3 g of bis(1,5-cyclooctadiene) nickel (0) (Stream Chemicals, USA), 1.9 g of 2,2'-bipyridine (Aldrich, USA) and 1.1 g of 1,5-cyclooctadiene (Aldrich, USA) were dissolved in 90 mL of dimethylformamide (Aldrich, USA). Separately, 2.5 g of 1,4-dichloroanthraquinone (Aldrich, USA) was dissolved in 60 mL of dimethylformamide (Aldrich, USA). Thereafter, the two solutions prepared were mixed and reacted under a nitrogen atmosphere at 60° C. for 48 hours. Subsequently, the reaction product was precipitated in 200 mL of 0.5 N HCl solution to produce a yellow precipitate. The precipitate was filtered through a filter, dissolved in chloroform again, and purified by recrystallization by adding methanol thereto to obtain a final product.

[Example 2] Preparation of Functional Separator

A functional separator (air permeability: 197 Sec/100 mL) was prepared in the same manner as in Example 1 above, except that poly(1,4-anthraquinone) was added in a content of 1 parts by weight relative to 100 parts by weight of reduced graphene oxide, the content of the coating layer (P14AQ-rGO) was changed to be 10 μg/cm$^2$ relative to the surface area of the base separator, and the thickness was changed to be 2 μm.

[Example 3] Preparation of Functional Separator

A functional separator (air permeability: 193 Sec/100 mL) was prepared in the same manner as in Example 1 above, except that poly(1,4-anthraquinone) was added in a content of 10 parts by weight relative to 100 parts by weight of reduced graphene oxide, the content of the coating layer (P14AQ-rGO) was changed to be 5 μg/cm$^2$ relative to the surface area of the base separator, and the thickness was changed to be 2 μm.

[Comparative Example 1] Conventional Separator

A bare separator made of polyethylene (PE) was prepared without a separate coating.

[Experimental Example 1] Evaluation of Uniformity of Coating of Functional Separator The uniformity of the coating of the functional separators prepared in Examples 1 to 3 was evaluated. FIG. 1 is an image of the surface of the functional separators according to the present invention observed by an electron microscope, and (a) to (c) of FIG. 1 correspond to Examples 1 to 3, respectively. It can be seen that in the case of the functional separator according to the present invention, the redox active polymer-conductive carbon composite layer (coating layer) coated on its surface was spread out evenly in a plate shape without agglomeration, as shown in FIG. 1.

[Examples 4 to 6 and Comparative Example 2] Manufacture of Lithium Secondary Battery Lithium-sulfur batteries in the form of coin cells comprising functional separators prepared in Examples 1 to 3 and Comparative Example 1, and 70 µl of electrolyte solution (DOL:DME (1:1), 1.0 M LiTFSI, 1 wt. % $LiNO_3$), sulfur as a positive electrode, and lithium metal as a negative electrode were manufactured.

[Experimental Example 2] Evaluation of Discharging Capacity and Lifetime Characteristics of Lithium Secondary Battery-A The discharging current rates of the lithium-sulfur batteries prepared from Examples 4 to 6 and Comparative Example 2 were set to be 0.1 C (3 times), 0.2 C (3 times), and then 0.5 C, and then discharging capacity and lifetime characteristics were observed. FIG. 2 is a graph showing discharging capacity (a) and lifetime characteristics (b) of the lithium secondary batteries according to Examples of the present invention and a Comparative Example. As shown in FIG. 2, it was confirmed that in the case lithium-sulfur batteries of Examples 4 to 6 in which a functional separator was applied, both discharging capacity and lifetime characteristics are excellent, as compared to the lithium-sulfur battery of Comparative Example 2 in which a conventional separator was applied.

[Experimental Example 3] Evaluation of Discharging Capacity and Lifetime Characteristics of Lithium Secondary Battery—B After charging the lithium-sulfur batteries prepared in Examples 5 and 6 and Comparative Example 2 in a constant current/constant voltage (CC/CV) mode, discharging capacity and lifetime characteristics were observed. FIG. 3 is a graph showing discharging capacity (a) and lifetime characteristics (b) of the lithium secondary batteries according to Examples of the present invention and a Comparative Example. It can be seen that even when charged in CC/CV mode, the lithium-sulfur batteries of Examples 5 and 6 to which a functional separator was applied show excellent initial discharging capacity, average specific capacity, and lifetime characteristics, as compared to the lithium-sulfur battery of Comparative Example 2 to which a conventional separator was applied, as shown in FIG. 3.

The invention claimed is:

1. A functional separator comprising:
   a base separator; and
   a redox active polymer-conductive carbon composite layer on a surface of the base separator, said redox active polymer-conductive carbon composite layer comprising a composite of a redox active polymer and a conductive carbon,
   wherein the conductive carbon comprises thermally exfoliated reduced graphene oxide.
2. The functional separator according to claim 1, wherein the redox active polymer is a lithium-conducting compound that accepts electrons to form a redox band.
3. The functional separator according to claim 1, wherein the redox active polymer is a (a) quinone-based compound selected from the group consisting of polyanthraquinone, polynaphthoquinone, and polybenzoquinone, or (b) a π-conjugated compound.
4. The functional separator according to claim 3, wherein the redox active polymer is polyanthraquinone, and the polyanthraquinone is poly (1,4-anthraquinone) or poly (1,5-anthraquinone).
5. The functional separator according to claim 1, wherein a weight ratio of the conductive carbon and the redox active polymer is 1:0.001 to 0.2.
6. The functional separator according to claim 1, wherein the redox active polymer-conductive carbon composite layer has a thickness of 0.1 lam to 20 µm.
7. The functional separator according to claim 1, wherein the redox active polymer-conductive carbon composite layer is present on the surface of the base separator in a content of 1 µg/cm 2 to 200 µg/cm$^2$ relative to a surface area of the base separator.
8. A lithium secondary battery comprising a positive electrode; a negative electrode; the functional separator of claim 1 interposed between the positive electrode and the negative electrode; and an electrolyte.
9. The lithium secondary battery according to claim 8, wherein the lithium secondary battery is a lithium-sulfur battery.
10. A method for manufacturing a functional separator comprising the steps of:
    (a) preparing a redox active polymer-conductive carbon composite dispersion by dispersing a redox functional group-containing polymer and conductive carbon in a solvent; and
    (b) coating the prepared redox active polymer-conductive carbon composite dispersion on a surface of a base separator,
    wherein the conductive carbon comprises thermally exfoliated reduced graphene oxide.
11. The method for manufacturing the functional separator according to claim 10, wherein upon dispersion in step (a), the redox functional group-containing polymer and the conductive carbon react at a temperature of room temperature to 100° C. for 1 hour to 24 hours.
12. The method for manufacturing the functional separator according to claim 11, wherein during the reaction, the redox functional group-containing polymer and the conductive carbon are bonded by π-π interaction.

* * * * *